March 16, 1965     L. S. GAUMER, JR     3,173,778
SEPARATION OF GASEOUS MIXTURES INCLUDING ARGON
Filed Jan. 5, 1961
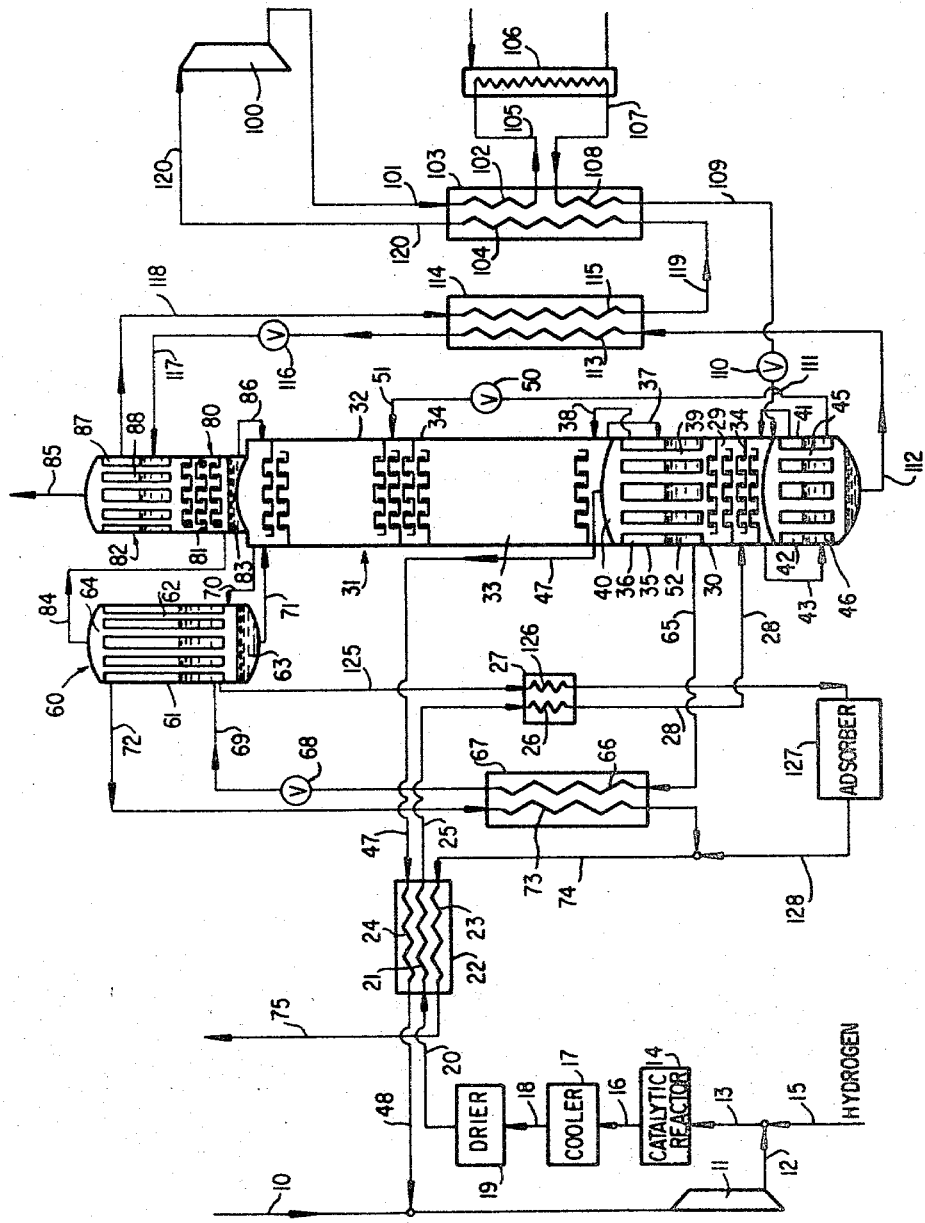
INVENTOR.
LEE S. GAUMER, JR.
BY *Shanley & O'Neil*
ATTORNEYS 3,173,778
SEPARATION OF GASEOUS MIXTURES INCLUDING ARGON
Lee S. Gaumer, Jr., Allentown, Pa., assignor, by mesne assignments, to Air Products and Chemicals, Inc., Trexlertown, Pa., a corporation of Delaware
Filed Jan. 5, 1961, Ser. No. 80,853
2 Claims. (Cl. 62—22)

This invention relates to the separation of gaseous mixtures and more particularly to the separation of argon containing gaseous mixtures by a process including low temperature fractionation to produce high purity argon.

A source of crude argon may be obtained from a side column associated with the fractionating column of a low temperature air separation plant. The argon product obtained from the side column includes substantial quantities of oxygen and nitrogen and processes have been provided in the past for removing substantial percentages of the oxygen and nitrogen and provide argon of fairly good purity. However, argon obtainable by the prior processes is not of sufficiently high purity required for certain applications such as a shielding gas in inert gas welding techniques where argon substantially devoid of nitrogen is required and the use of argon as an atmosphere for metallurgical processes in which the argon is required to be free of oxygen as well as other impurities, such as argon having a maximum impurity content of no more than 50 p.p.m. The use of argon as an atmosphere for metallurgical processes not only presents the problem of providing argon of the required high purity but also the problem of maintaining the atmosphere within the required limits throughout the metallurgical process. Thus, it is necessary to continuously treat the atmosphere to remove impurities, such as air, which seeps into the chamber containing the atmosphere and impurities entering the atmosphere due to the metallurgical process, and an efficient process for attaining such purification is essential to the economical feasibility of using inert atmosphere in metallurgical processes.

It is therefore an object of the present invention to provide a novel process for producing high purity argon.

Another object is to provide a novel method of separating gaseous mixtures including a low temperature operation to produce argon having a maximum impurity content no greater than 50 p.p.m.

Still another object of the present invention is to provide a novel method of separating gaseous mixtures including a low temperature process for producing high purity argon in which the recovery of argon is high and the power requirements for the operation are low as compared to prior processes.

The present invention provides a novel method for the separation of gaseous mixtures, such as argon containing gaseous mixtures, by a low temperature fractionating process to produce a component, such as argon of high purity, in which the reflux requirements for the fractionating process are achieved by a unique arrangement employing the high purity argon component which makes it possible to improve recovery of argon at the required high degree of purity and to reduce power requirements; the arrangement being used alone or in combination with systems for removing specific impurities such as the removal of oxygen by a catalytic reaction with hydrogen and the subsequent treatment of the catalytic reaction product to remove hydrogen.

The single figure of the drawing is a diagrammatic illustration of a system for the separation of gaseous mixtures embodying principles of the present invention.

Referring to the drawing, gaseous mixture containing argon as the major component and including oxygen and nitrogen impurities and which may also include small amounts of water vapor and hydrocarbons, enters the system through conduit 10 and passes to a compression unit 11. Compressed gaseous mixture is passed through conduits 12, and 13 to catalytic reactor 14. A stream of hydrogen enters the system through conduit 15 and is passed to the catalytic reactor 14 such as by a connection of conduit 15 to conduit 13, as shown. In the catalytic reactor 14, the oxygen of the gaseous mixture reacts with the added hydrogen to form water, and in order to insure that the total oxygen of the gaseous mixture is removed the quantity of hydrogen added is in excess of the stoichiometric amount required for reaction with the total oxygen of the gaseous mixture. Thus, the reaction product of the reactor 14 includes the argon and nitrogen and any incidental impurities of the gaseous mixture as well as moisture initially present and water resulting from the catalytic reaction and the excess hydrogen. The reaction product is passed by a conduit 16 to a cooler 17 and then by conduit 18 to a drier 19, which may be an adsorbent type, wherein the water is removed from the reaction product. In the cooler 17, the temperature of the reaction product may be reduced to below the condensation temperature of water and thus reduce the required drier capacity.

The reaction product, free of water, is conducted by conduit 20 to pass 21 of a three pass heat exchange device 22 where the reaction product is cooled to a low temperature by countercurrent heat interchange with relatively cold products of a fractionating operation, described below, flowing through passes 23 and 24 of the heat exchange device. The cool reaction product is conducted by conduit 25 for flow through pass 26 of heat exchange device 27 in heat interchange with a relatively cold fluid as described below, and the thus further cooled reaction product, which may be at or close to its saturation temperature, is conducted by conduit 28 to a high pressure fractionating zone 29 of a fractionating column 30 which may comprise the high pressure section of a multi-stage fractionating column 31 as shown, which also includes a low pressure section 32 presenting a low pressure fractionating zone 33; the fractionating zones 29 and 33 being provided with suitable vapor-liquid contact means such as bubble-type fractionating trays 34. The sections 30 and 32 are joined by a condenser-evaporator 35; however, a structurally independent condenser-evaporator may be employed if desired. The shell side 36 of the condenser-evaporator is in liquid and vapor communication with the low pressure fractionating zone 33 through conduits 37 and 38, respectively, and the tubes 39 communicate at their lower ends with the high pressure fractionating zone 29 and at their upper ends with dome space 40. The high pressure section 30 is provided with a reboiler condenser 41, the shell side 42 of which is in liquid and vapor communication with the high pressure fractionating zone 29 through conduits 43 and 44, respectively, and the tubes 45 receive relatively warm fluid as described below.

The water-free reaction product undergoes partial separation in the high pressure fractionating zone 29 producting liquid high boiling point fraction, under high pressure, which collects in a pool 46 in the shell space 42 of the reboiler condenser 41 and a gaseous low boiling point fraction, under high pressure, which flows upwardly through the tubes 39 of the condenser-evaporator 35 and collects in the dome space 40. The low boiling point fraction of the high pressure fractionating zone contains substantially the total hydrogen of the reaction product and is withdrawn from the dome 40 by a conduit 47 and conducted thereby for flow through the pass 24 of the heat exchange device 22 in countercurrent heat interchange with the reaction product; the low boiling point fraction leaves the warm end of the heat exchange device 22 at about ambient temperature and is merged by way of conduit 48 with the gaseous mixture in conduit 10 to decrease the hydrogen requirements of the catalytic reaction. The liquid high boiling point fraction collecting in the pool 46 is free of hydrogen and contains a major portion of the argon and substantially the total nitrogen of the reaction product. A stream of liquid is withdrawn from the pool 46 by a conduit 49, expanded in valve 50 to the pressure of the low pressure section 32 and introduced through conduit 51 as feed into the low pressure fractionating zone 33 wherein the separation is continued, producing gaseous low boiling point fraction collecting in the upper end of the low pressure section and liquid high boiling point fraction, consisting of high purity argon, collecting in a pool 52 in the shell space 36 of the condenser-evaporator 35. The heat interchange between the liquid high boiling point fraction collecting in the pool 52 and high pressure gaseous low boiling point fraction flowing upwardly through the tubes 39 results in liquefaction of gaseous low boiling point fraction to provide reflux for the high pressure fractionating zone, while reboiling for this fractionating zone is obtained by partial vaporization of liquid high boiling point fraction collecting in the pool 46 upon heat interchange with relatively warm fluid flowing through the tubes 45 of the condenser 41.

As mentioned above, the present invention provides a novel arrangement for obtaining reflux for the low pressure fractionating zone which makes it possible to meet the reflux requirements necessary to obtain argon of the required high purity with a material saving in power which provides an increase in argon recovery. The arrangement includes a condenser-evaporator 60 which may be of the tube and shell type, as shown, including a shell space 61 and a plurality of tubes 62 communicating at their lower ends with a liquid receiving space 63 and at their upper ends with a vapor receiving space 64. Liquid high boiling point fraction from the low pressure fractionating zone, under reduced pressure, is introduced into the shell space 61 and evaporated therein upon heat interchange with gaseous low boiling point fraction produced in the low pressure fractionating zone with resulting liquefaction of the low boiling point fraction which is used as reflux for the low pressure fractionating zone. The remaining reflux requirement of the low pressure fractionating zone is obtained by liquefaction of additional low boiling point fraction upon evaporation of a relatively cold liquid material. In particular, liquid high boiling point fraction is withdrawn from the pool 52 through conduit 65, subcooled upon flowing through pass 66 of heat exchange device 67, expanded to a relatively low pressure in valve 68 and introduced through conduit 69 into the shell space 61. Gaseous low boiling point fraction is withdrawn from the top of the low pressure fractionating zone 33 through a conduit 70 and conducted thereby to the condenser-evaporator 60 in communication with the lower ends of the tubes 62. Low boiling point fraction which is liquefied upon vaporization of the liquid high boiling point fraction collects in the space 63 and is withdrawn therefrom through conduit 71 and returned thereby to the low pressure fractionating zone as reflux. Vaporized high boiling point fraction is withdrawn from the upper end of the shell space 61 through a conduit 72, flowed through pass 73 of heat exchange device 67 to effect the subcooling of the high pressure stream in pass 66, and then conducted by conduit 74 for flow through the pass 23 of the heat exchange device 22 in countercurrent heat interchange with the reaction product; the high boiling point component leaves the warm end of the heat exchange device 22 through conduit 75 at substantially ambient temperature and comprises the high purity argon product of the system.

The gaseous low boiling point fraction passed to the condenser-evaporator 60 is of a composition such that its boiling point under the existing pressure is sufficiently higher than the temperature of the expanded liquid argon to provide the driving force necessary to evaporate completely the liquid argon. By utilizing liquefied material having a boiling point temperature lower than that of the expanded liquid argon to obtain the required additional reflux, such as nitrogen, it is possible to further rectify the portion of the gaseous low boiling point fraction not liquefied by heat interchange with the expanded liquid argon and thereby improve argon recovery. This is achieved by the provision of a third fractionating column or zone 80, provided with liquid-vapor contact means such as trays 81 and a condenser 82 at its upper end and a liquid receiving space 83 at its lower end. The unliquefied portion of the gaseous low boiling point fraction fed to the condenser-evaporator 60 is withdrawn from the space 64 and passed by conduit 84 to the lower end of the column 80 as feed which is separated into a second gaseous fraction withdrawn through conduit 85 and a second liquid portion withdrawn from the space 83 through conduit 86 and introduced into the top of the low pressure fractionating zone 33 as reflux. Cold liquid material, preferably liquid nitrogen, is fed to the shell side 87 of the condenser 82 to effect partial liquefaction of the second gaseous fraction flowing upwardly through tubes 88 of the condenser and thus provide reflux for the fractionating zone 81. The second gaseous fraction in conduit 85 may be passed in heat interchange with the reaction product, if desired.

Although the third fractionating column 80 is disclosed as being separated from the low pressure section 32, it may be considered as an extension of the section 33 and it is to be expressly understood that the present invention encompasses the concept of withdrawing vapor from a fractionating zone at the proper composition so that it is liquefied upon heat interchange with a liquid material of the process and to return the resulting liquid to the fractionating zone as reflux.

The liquid nitrogen fed to the condenser is obtained from a closed refrigeration cycle in which part of the required refrigeration is obtained by the partial vaporization of liquid high boiling point fraction of the high pressure fractionating zone 29 in the reboil condenser 41. As shown, dry nitrogen gas, compressed to a relatively high pressure in a compressor 100, is conducted through a conduit 101 to pass 102 of a heat exchange device 103 where it is cooled by countercurrent heat interchange with relatively cold gaseous nitrogen flowing through pass 104 of the heat exchange device. At an intermediate point of the heat exchange device 103, the high pressure nitrogen stream is withdrawn and passed by conduit 105 to heat exchange device 106 for heating interchange with a source of external refrigeration. The nitrogen flows from the heat exchange device 106 through conduit 107 connected to pass 108 of the heat exchange device 103 and leaves the cold end of the latter heat exchange device through conduit 109. The cooled nitrogen is expanded in valve 110 to a relatively low intermediate pressure, and the expanded nitrogen, partly in liquid phase, is introduced by conduit 111 into the tubes 45 of the reboiler condenser 41 where the nitrogen is totally liquefied upon vaporization of liquid high boiling point fraction. Liquid nitrogen is withdrawn from the reboiler condenser 41 through conduit 112, subcooled upon flowing through pass 113 of heat exchange device 114 in countercurrent heat interchange with relatively cold gaseous nitrogen flowing through pass 115, expanded in valve 116 to a relatively low pressure and then introduced through conduit 117 into the shell space 87 of the condenser 82. The liquid nitrogen is vaporized in the condenser 82 and gaseous nitrogen is withdrawn from the condenser through conduit 118 and conducted to the pass 115 of the heat exchange device 114. From the warm end of the latter heat exchange device, the gaseous nitrogen is conducted to conduit 119 for flow through the pass 104 of the heat exchange device 103 and from the latter heat exchange device is conducted by conduit 120 to the inlet of the compressor 100.

Hydrocarbon impurities that may enter the system with the gaseous mixture will concentrate in the liquid argon collecting in the condenser-evaporator 60. Such impurities may be removed by withdrawing a small quantity of liquid argon from condenser 60 through conduit 125. Such liquid argon is vaporized upon flow through pass 126 of heat exchange device 27 and then passed through an adsorber 127 wherein any hydrocarbons present are removed. The argon is removed from the adsorber by conduit 128 and mixed with gaseous argon in the conduit 74.

The following data is typical of conditions existing in the system operating in accordance with the present invention. Gaseous mixture entering through conduit 10 contains argon as a major component and, on the basis of 100 pounds per hour, about 150 p.p.m. of nitrogen, about 50 p.p.m of oxygen, about 50 p.p.m. of water vapor and less than about 5 p.p.m. of other impurities such as hydrocarbons. The abbreviation p.p.m. as used herein represents parts per million by weight. This gas enters at 75° F., and is compressed from a pressure of 13.9 p.s.i.a. to from 67 to 90 p.s.i.a. at about 90° F. by compressor 11 which may be of any suitable type. Hydrogen at a temperature of about 70° F. is added to the compressed gaseous mixture through line 15 is an amount sufficient to provide an excess of approximately 1% hydrogen in the reaction product from the catalytic reactor 14.

The catalytic reactor 14 comprises a container filled with a platinum-palladium catalyst and the reaction product contains less than 1 p.p.m. of oxygen, 135 p.p.m. of nitrogen and 1% of hydrogen and about 2% of water vapor. The temperature of the gaseous reaction product leaving the catalytic reactor is about 525° F. The reaction product is cooled in cooler 17 to below the condensation temperature of water. The water is removed from the reaction product in drier 19 and the dried reaction product flows to heat exchanger 22 at a rate of about 110 pounds per hour, and a pressure of about 66 p.s.i.a. and enters at a temperature of about 40° F. The reaction product upon flowing through the heat exchange device 22 and the heat exchange device 27 is cooled to about −270° F. and enters the high pressure fractionating zone 29 at about 65 p.s.i.a.

The low boiling point gaseous fraction withdrawn from the dome 40 of the condenser-evaporator 35 comprises about 10% hydrogen and about 90% argon, and is at a temperature of −275° F. and a pressure 64 p.s.i.a. The stream is withdrawn at a rate of about 11 pounds per hour and leaves the warm end of the heat exchange device 22 at a temperature of about 30° F. and a pressure of about 62 p.s.i.a.

The liquid high boiling point fraction is withdrawn from the pool 46 of the reboiler 41 at a rate of 100 lbs./hour and comprising about 98% argon and 2% nitrogen and is at a pressure of about 64 p.s.i.a. and a temperature of about −270° F. The stream is expanded through valve 50 to a pressure of about 40 p.s.i.a. and a is further cooled to a temperature of about −280° F.

The gaseous low boiling point fraction withdrawn from the top of the low pressure fractionating zone 33 comprises about 63% argon and 37% nitrogen and passes through conduit 70 to condenser 60 at a rate of about 95 lbs./hour while under a pressure of about 36 p.s.i.a. and a temperature of about −295° F. Liquid reflux comprising about 63% argon and 37% nitrogen returns from condenser 60 to low pressure fractionating zone 33 through conduit 71 at a rate of about 75 lbs./hour and a temperature of about −295° F. Unliquefied low boiling point fraction comprising about 63% argon and about 37% nitrogen flows from the top of condenser 60 through conduit 84 at a rate of about 20 lbs./hour and a temperature of about −304° F. Liquid reflux comprising about 63% argon and about 37% nitrogen flows from the bottom of the third column 80 through conduit 86 at a rate of about 19 lbs./hours and a temperature of about −304° F. The gaseous fraction flows from the top of the column 80 through conduit 85 at a rate of about 2 cu. ft./hr.; this gas is at a temperature of about −309° F. and comprises a mixture of about 90% nitrogen and about 10% argon.

Substantially pure liquid argon containing less than 5 p.p.m. of impurities, primarily hydrocarbons, flows from the bottom of the low pressure fractionating zone through conduit 37 to pool 52 at a rate of about 200 lbs./hour, while under a pressure of about 40 p.s.i.a and a temperature of about −280° F. Argon vapor flows from condenser-evaporator 35 through conduit 38 to the low pressure fractionating zone at a rate of about 100 lbs./hour, while under a pressure of about 40 p.s.i.a. and a temperature of about −280° F. The substantially pure liquid argon is withdrawn from the pool 52 through conduit 65 at a rate of about 100 lbs./hour, while under a pressure of about 40 p.s.i.a. and a temperature of about −280° F. This liquid argon is cooled to about −294° F. in heat exchange device 67 and expanded through valve 68 to a pressure of about 17 p.s.i.a., and thereby cooled to a temperature of about −300° F. After being vaporized in condenser-evaporator 60, the pure argon in gaseous phase flows through conduit 72 at a temperature of about −300° F. and a pressure of about 17 p.s.i.a.; the gaseous argon is warmed in heat exchange device 67 to about −286° F. and is heated to about 30° F. upon flow through the heat exchange device 22 and leaves the system through conduit 75 at substantially that temperature and under a pressure of about 15 p.s.i.a. and at a rate of about 100 lbs./hour and contains less than 50 p.p.m. of impurities including less than 5 p.p.m. of oxygen.

With regard to the nitrogen refrigeration cycle, about 25 lbs./hour of dry nitrogen gas is compressed to about 2900 p.s.i.a. in the compressor 100, the temperature of the gaseous nitrogen leaving the compressor being about 100° F. The compressed nitrogen leaving the pass 102 of the heat exchange device 103 is at about −33° F., is further cooled to about −70° F. in the heat exchange device 106, and leaves the cold end of the heat exchange device 103 at about −180° F. The cooled compressed nitrogen is expanded in valve 110 to about 173 p.s.i.a. and further cooled to about −268° F., the expanded nitrogen being about 20% in liquid phase. The expanded nitrogen is totally liquefied in the reboiler 41 and enters the heat exchange device 114 at about −268° F. and is subcooled upon flowing through the pass 113 to a temperature of about −285° F. The subcooled nitrogen is expanded across valve 116 to a pressure of about 29 p.s.i.a. with further cooling to a temperature of about −309° F. The evaporated nitrogen leaving condenser 82 is under a pressure of about 29 p.s.i.a. and a temperature of about −309° F., is warmed in heat exchange device 114 to a temperature of about −273° F. and further warmed in heat exchange device 103 to a temperature of about 95° F.

It will be understood that various changes, omissions and additions may be made to this invention without departing from the spirit and scope thereof as set forth in the appended claims.

What is claimed is:

1. Method of obtaining high purity argon from a gaseous mixture including oxygen, nitrogen and argon which comprises passing over a catalyst compressed gaseous mixture and a quantity of hydrogen in excess of the stoichiometric amount required for a catalytic reaction with the oxygen of the gaseous mixture to form water to provide a reaction product including water, argon, hydrogen and nitrogen, removing water from the reaction product, cooling the reaction product, separating the reaction product under high pressure and relatively low temperature in a first fractionating zone producing first high boiling liquid fraction and first low boiling point gaseous fraction, the first high boiling point liquid fraction comprising argon and nitrogen and the first low boiling point fraction containing substantially the total hydrogen content of the gaseous mixture, separating first high boiling point liquid fraction under low pressure in a second fractionating zone producing second high boiling point liquid fraction and second low boiling point gaseous fraction, the second high boiling point liquid fraction comprising high purity argon and the second low boiling point gaseous fraction containing substantially the total nitrogen of the gaseous mixture, establishing heat interchange between second high boiling point liquid fraction and first low boiling point gaseous fraction to liquefy first low boiling point gaseous fraction as reflux for the first fractionating zone, withdrawing second high boiling point liquid fraction from the second fractionating zone, expanding withdrawn second high boiling point liquid fraction to a relatively low pressure, passing expanded second high boiling point fraction in heat exchange effecting relation with second low boiling point gaseous fraction to vaporize expanded second high boiling point fraction and effect partial liquefaction of second gaseous low boiling point fraction, separating the liquefied portion of the second low boiling point fraction from the unliquefied portion of the second low boiling point fraction, returning the liquefied portion of the second low boiling point fraction to the second fractionating zone as reflux, subjecting the unliquefied portion of the second low boiling point fraction to further separation in a third fractionating zone to produce a third high boiling point liquid fraction and a third low boiling point gaseous fraction, passing cool compressed gaseous material in heat exchange relation with first high boiling point in liquid fraction to vaporize first high boiling point fraction as reboil for the first fractionating zone and further cool the gaseous material, expanding further cool gaseous material to a relatively low pressure, passing expanded gaseous material in heat interchange with third gaseous low boiling point fraction to liquefy third gaseous low boiling point fraction as reflux for the third fractionating zone, passing expanded gaseous material after the last-named heat interchange in heat interchange with cool gaseous material prior to its expansion and thereafter warming, compressing and cooling the gaseous material to provide said cool compressed gaseous material, utilizing third liquid high boiling point fraction as reflux for the second fractionating zone, and passing vaporized expanded second high boiling point fraction and first low boiling point fraction in heat interchange with the gaseous mixture.

2. Method of obtaining high purity argon as defined in claim 1 in which second high boiling point liquid fraction withdrawn from the second fractionating zone is passed in heat interchange with vaporized expanded second high boiling point fraction prior to expansion.

References Cited by the Examiner
UNITED STATES PATENTS

| | | |
|---|---|---|
| 2,284,662 | Kahle | June 2, 1942 |
| 2,327,643 | Houghland | Aug. 24, 1943 |
| 2,729,954 | Etienne | Jan. 10, 1956 |
| 2,777,305 | Davison | Jan. 15, 1957 |
| 2,826,480 | Webster | Mar. 11, 1958 |
| 2,874,030 | Dennis | Feb. 17, 1959 |
| 2,990,689 | Lorenz | July 4, 1961 |
| 3,062,016 | Dennis | Nov. 6, 1962 |